US008576242B2

(12) United States Patent
Kitago

(10) Patent No.: US 8,576,242 B2
(45) Date of Patent: Nov. 5, 2013

(54) IMAGE PROCESSING USING MESHES AND GRADIENT INFORMATION

(75) Inventor: Masaki Kitago, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 821 days.

(21) Appl. No.: 12/725,768

(22) Filed: Mar. 17, 2010

(65) Prior Publication Data

US 2010/0259541 A1 Oct. 14, 2010

(30) Foreign Application Priority Data

Apr. 8, 2009 (JP) ................................ 2009-094367
Mar. 8, 2010 (JP) ................................ 2010-051126

(51) Int. Cl.
*G09G 5/00* (2006.01)

(52) U.S. Cl.
USPC .......................................................... 345/589

(58) Field of Classification Search
None
See application file for complete search history.

(56) References Cited

U.S. PATENT DOCUMENTS 5,915,046 A 6/1999 Echigo et al.
6,271,861 B1 8/2001 Sargent et al.
6,300,958 B1 * 10/2001 Mallet ........................... 345/442
6,313,840 B1 11/2001 Bilodeau et al.
6,600,488 B1 * 7/2003 Moreton et al. .............. 345/423
2002/0171644 A1 * 11/2002 Reshetov et al. ............. 345/420
2005/0237341 A1 * 10/2005 Gangnet et al. ............... 345/606
2008/0278479 A1 11/2008 Sun et al.

FOREIGN PATENT DOCUMENTS

JP 10-320585 12/1998
JP 11-345347 12/1999
JP 3-764765 4/2006

OTHER PUBLICATIONS

Jian Sun, et al., "Image Vectorization using Optimized Gradient Meshes", Microsoft Research Asia, pp. 1-7, 2007, Published Jul. 2007.

* cited by examiner

*Primary Examiner* — Edward Martello
(74) *Attorney, Agent, or Firm* — Fitzpatrick, Cella, Harper & Scinto

(57) ABSTRACT

A boundary correction unit divides an object area into plural meshes, and specifies, of a pixel group positioned on one side, in a direction toward the interior of the object area, of a mesh to which a boundary vertex positioned on the frame of the object area belongs, a pixel at a position where the amount of change in color in the direction is equal to or smaller than a threshold value as a correction pixel for each boundary vertex. The boundary correction unit obtains a curve that connects adjacent correction pixels to each other for each set of adjacent correction pixels, and obtains the area surrounded by the obtained curves as a non-correction area. The boundary correction unit updates the object area by assigning the values of respective pixels on the frame of the non-correction area to those of corresponding pixels positioned on the frame of the object area.

11 Claims, 13 Drawing Sheets

F I G. 8
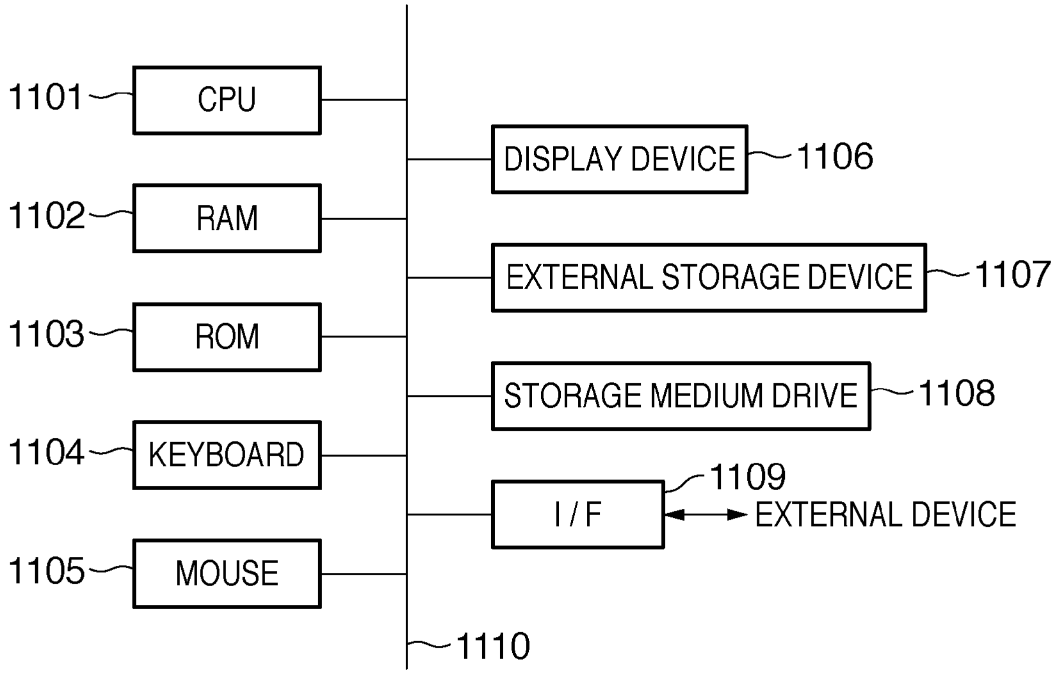
F I G. 9
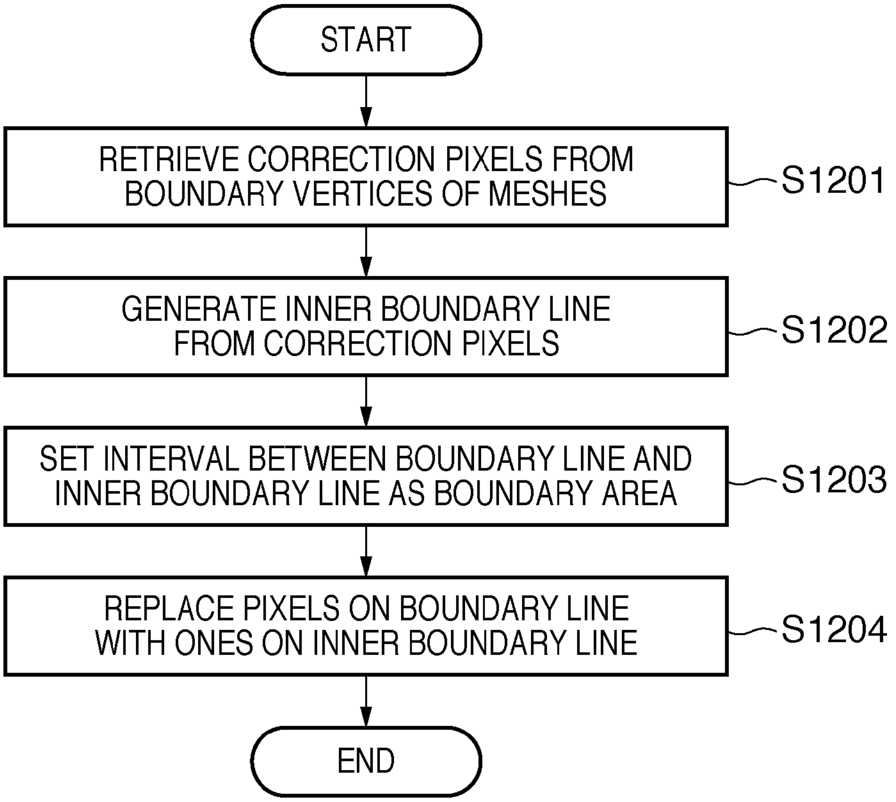

IMAGE PROCESSING USING MESHES AND GRADIENT INFORMATION

BACKGROUND OF THE INVENTION

1. Field of the Invention

The present invention relates to a resolution-free image representation technique for converting an object in a raster image into gradient meshes by approximating the object by adjusting the positions, gradients, and colors of the meshes so as to reduce color errors between the meshes and the object.

2. Description of the Related Art

A method of approximating the contour of an object by a function such as a Bezier function or a spline function has been conventionally used for resolution-free representation of illustrations and texts. This method is a commonly used high-speed representation method but is poor for complex gradation representations.

A gradient mesh tool in Adobe Illustrator® is generally used to draw an object containing a complex gradation by resolution-free representation. The gradient mesh method can be used to draw a complex object by generating a cubic function by adding colors and gradients to meshes (patent references 1 and 2).

For a resolution-free representation of an object containing a complex gradation, some proposed methods approximate an image by meshes. An example of these methods is a method using triangular patches (patent reference 3) to approximate an image, and a method to reduce approximation errors by dividing Bezier patches into individual small areas (non-patent reference 1). Another proposed method realizes a resolution-free representation using a relatively small number of meshes that is achieved through constructing gradient meshes by solving an optimization problem (patent reference 4 and non-patent reference 2).

[Patent Reference 1] Japanese Patent Laid-Open No. 11-345347

[Patent Reference 2] Japanese Patent Laid-Open No. 10-320585

[Patent Reference 3] Japanese Patent Registration No. 03764765

[Patent Reference 4] U.S. Pre-Grant Publication No. 2008/0278479

[Non-patent Reference 1] Brian Price, William Barrett, "Object-based vectorization for interactive image editing", In proceedings of Pacific Graphics 2006, 2006, vol. 22, Nos. 9-11, pp. 661-670.

[Non-patent Reference 2] Jian Sun, Lin Liang, Fang Wen, Heung-Yeung Shum, "Image Vectorization using Optimized Gradient Meshes", In proceedings of SIGGRAPH 2007, 2007, vol. 26, No. 3.

The above-mentioned method of approximating an image using triangular patches poses a problem associated with object boundary representation. When the object boundary has a smooth curve, it is difficult to faithfully approximate this curve by linear meshes, so a large number of meshes must be used to faithfully approximate this curve. High-order meshes need to be used to approximate a complex boundary by a smaller number of meshes.

Since the above-mentioned method of reducing approximation errors by dividing Bezier patches into individual small areas uses high-order meshes, it can faithfully approximate the object boundary. However, this method divides meshes into individual small areas in order to reduce approximation errors, so it requires a relatively large number of meshes and, in turn, requires a relatively large amount of data to approximate a portion where a change in color of the object is complex.

The above-mentioned methods of constructing gradient meshes by solving an optimization problem and calculating an evaluation function for each triangular patch can realize a resolution-free representation by a smaller number of meshes in both the object boundary and a portion where a change in color of the object is complex. However, if a vertex of a gradient mesh is located in a pixel that has an intermediate color between the colors of the object and the background and is generated at the object boundary upon processing such as anti-aliasing, the adverse influence of the intermediate color spreads into the mesh. This poses a problem that meshes cannot be generated with sufficient approximation accuracy.

SUMMARY OF THE INVENTION

The present invention has been made in consideration of the above-described problems, and provides a technique for efficiently approximating an object by gradient meshes.

According to the first aspect of the present invention, there is provided an image processing apparatus comprising: a unit which extracts an area of an object from an image as an object area; a division unit which divides the object area into a plurality of meshes and obtains position information, gradient information, and color information of respective vertices which form the meshes; a specification unit which specifies, of a pixel group positioned on one side, in a direction toward an interior of the object area, of a mesh to which a boundary vertex positioned on a frame of the object area belongs, a pixel at a position where an amount of change in color in the direction is not more than a threshold value as a correction pixel for each boundary vertex; a unit which obtains a curve that connects adjacent correction pixels to each other for each set of adjacent correction pixels, and obtains an area surrounded by the obtained curves as a non-correction area; and an update unit which updates the object area by assigning values of respective pixels on a frame of the non-correction area to values of corresponding pixels positioned on the frame of the object area.

According to the second aspect of the present invention, there is provided an image processing apparatus comprising: a unit which extracts an area of an object from an image as an object area; a specification unit which specifies a pixel within the object area in the vicinity of a boundary pixel, positioned on a frame of the object area, as a correction pixel for each boundary pixel; an update unit which updates the object area by assigning a value of the correction pixel to a value of the boundary pixel; and a division unit which divides the object area updated by the update unit into a plurality of meshes and obtains position information, gradient information, and color information of respective vertices which form the meshes.

According to the third aspect of the present invention, there is provided an image processing method for an image processing apparatus, comprising: a step of extracting an area of an object from an image as an object area by a processing unit included in the image processing apparatus; a division step of, by the processing unit, dividing the object area into a plurality of meshes and obtaining position information, gradient information, and color information of respective vertices which form the meshes; a specification step of, by the processing unit, specifying, of a pixel group positioned on one side, in a direction toward an interior of the object area, of a mesh to which a boundary vertex positioned on a frame of the object area belongs, a pixel at a position where an amount of change in color in the direction is not more than a threshold value as a correction pixel for each boundary vertex; a step of, by the processing unit, obtaining a curve which connects adjacent correction pixels to each other for each set of adjacent correction pixels, and obtaining an area surrounded by the obtained curves as a non-correction area; and an update step of, by the processing unit, updating the object area by assigning values of respective pixels on a frame of the non-correction area to values of corresponding pixels positioned on the frame of the object area.

According to the fourth aspect of the present invention, there is provided an image processing method for an image processing apparatus, comprising: a step of extracting an area of an object from an image as an object area; a specification step of specifying a pixel within the object area in the vicinity of a boundary pixel, positioned on a frame of the object area, as a correction pixel for each boundary pixel; an update step of updating the object area by assigning a value of the correction pixel to a value of the boundary pixel; and a division step of dividing the object area updated in the update step into a plurality of meshes and obtaining position information, gradient information, and color information of respective vertices which form the meshes.

Further features of the present invention will become apparent from the following description of exemplary embodiments with reference to the attached drawings.

BRIEF DESCRIPTION OF THE DRAWINGS

FIG. 8 is a block diagram illustrating an example of the hardware configuration of a computer;

FIG. 9 is a flowchart of processing by a boundary correction unit 103;

DESCRIPTION OF THE EMBODIMENTS

Embodiments of the present invention will be described below with reference to the accompanying drawings. Note that the embodiments to be described hereinafter merely exemplify a case in which the present invention is actually practiced, and are practical embodiments of the arrangement defined in claims.

First Embodiment

Figure 1:
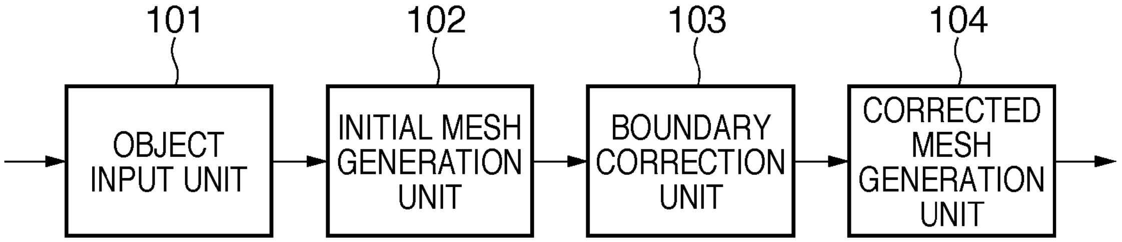
FIG. 1 is a block diagram illustrating an example of the functional arrangement of an image processing apparatus according to the first embodiment.

An example of the functional arrangement of an image processing apparatus according to this embodiment will be explained first with reference to FIG. 1. As shown in FIG. 1, the image processing apparatus according to this embodiment includes an object input unit 101, initial mesh generation unit 102, boundary correction unit 103, and corrected mesh generation unit 104.

The object input unit 101 receives an input image containing one or more objects. This “object” means a text or an object image. This embodiment will be explained assuming that this “object” contains a color gradation.

Figure 3A:
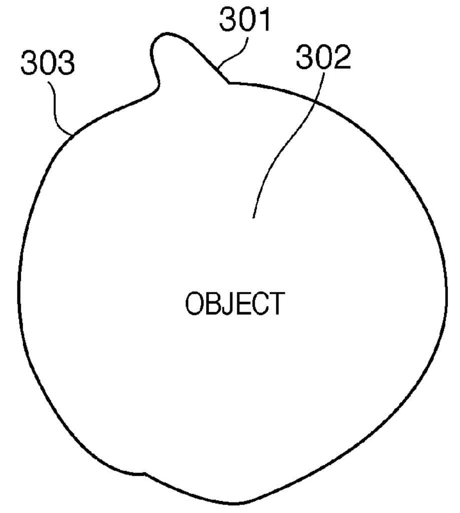
FIGS. 3A to 3D are views showing the extracted object area.

The object input unit 101 extracts the area of an object from the input image as an object area. FIG. 3A illustrates one example of the extracted object area. Data on the extracted object area includes the coordinate positions, in the input image, of respective pixels which form a frame 303 of an object area 301, and the values of respective pixels which form an interior 302 of the object area 301. Although this embodiment will be explained assuming that the pixel value represents each of R, G, and B color components by 8 bits, the type of color component and the number of bits which form one color component are not limited to this. Also, data on an object area may have another structure as long as it is possible to obtain the coordinate positions of respective pixels that form the frame of the object area, and the values of respective pixels that form the interior of the object area. The object input unit 101 sends the data on the extracted object area to the initial mesh generation unit 102 in the subsequent stage.

Figure 2:
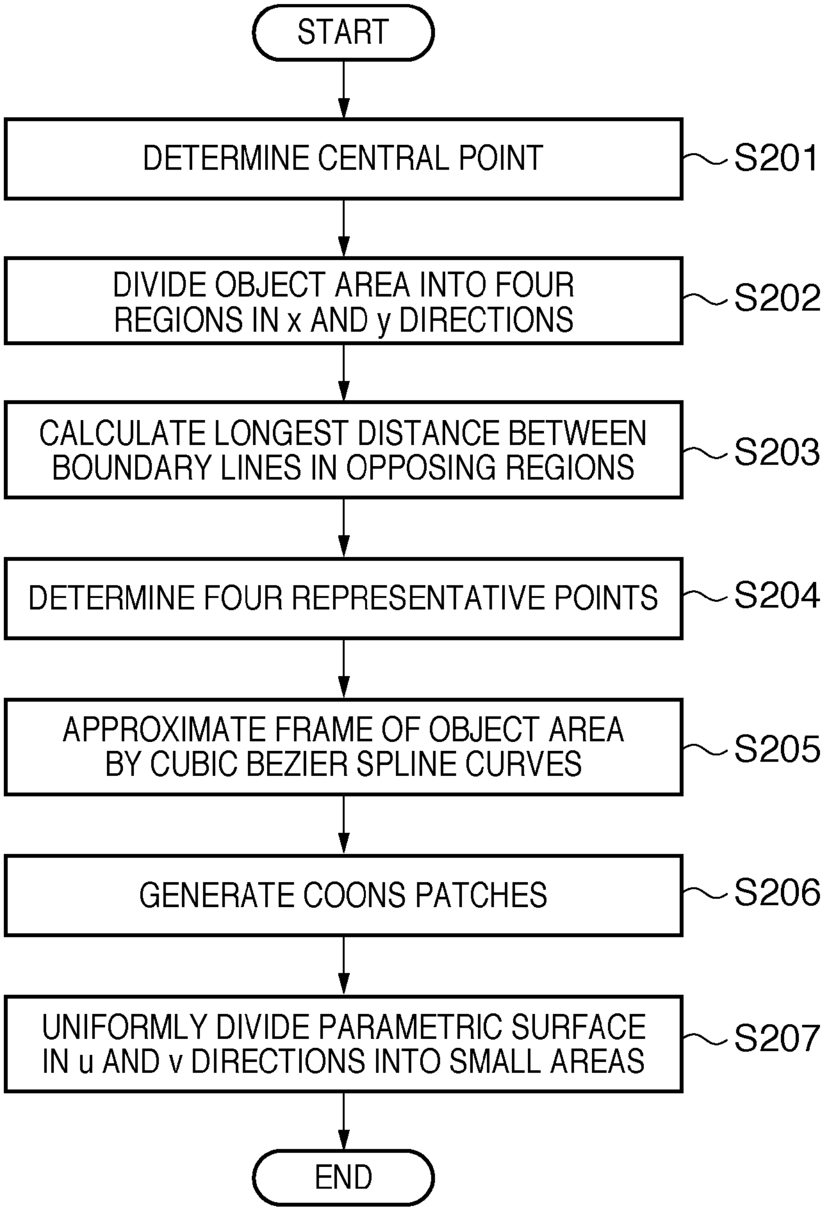
FIG. 2 is a flowchart of processing performed using data on an object area by an initial mesh generation unit 102.

Processing performed using the data on the object area by the initial mesh generation unit 102 will be explained with reference to FIG. 2. In step S201, using the coordinate positions of respective pixels that form the frame of the object area, the initial mesh generation unit 102 obtains a reference position within the object area. In this embodiment, the barycentric position (central position) of the object area is obtained as the reference position. As a matter of course, the reference position within the object area is not limited to the central position, and the processing for obtaining the central position is not limited to this, either.

In step S202, the initial mesh generation unit 102 sets two axes (the x- and y-axes), which intersect with each other at right angles at the central position obtained in step S201, within the object area to divide the object area into four regions. That is, four divided regions are obtained by the two axes.

Figure 3B:
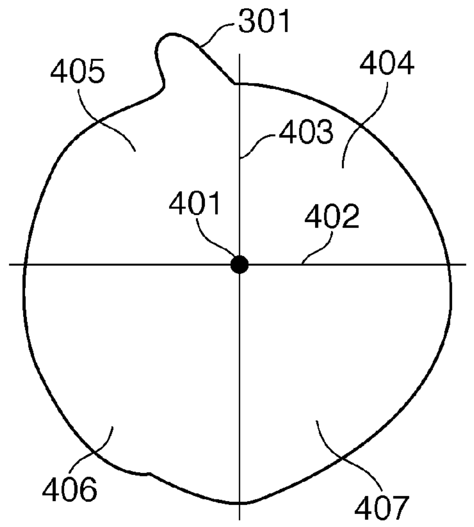

The processes in steps S201 and S202 will be explained with reference to FIG. 3B. Referring to FIG. 3B, reference numeral 401 denotes the central position obtained in step S201; and 402 and 403, two axes which intersect with each other at right angles at the central position 401 and run in the x- and y-axis directions, respectively, in the input image. The object area 301 is divided into divided regions 404, 405, 406, and 407 by setting the two axes 402 and 403.

Referring back to FIG. 2, in steps S203 and S204, the initial mesh generation unit 102 sets representative points on the frame portions of the respective divided regions such that the distance between the representative points in opposing divided regions is longest.

Figure 3C:
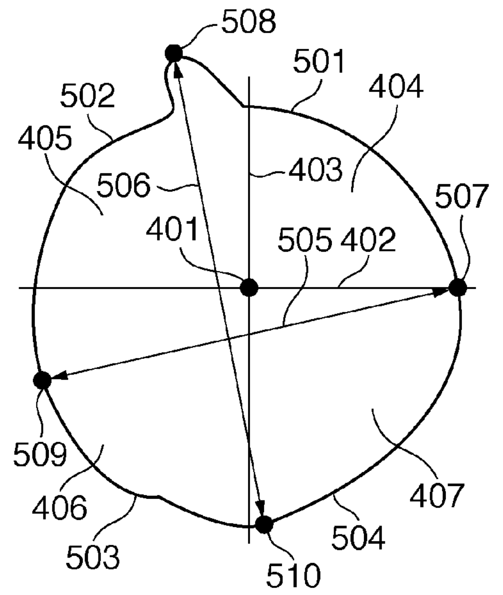

The processes in steps S203 and S204 will be explained with reference to FIG. 3C. Referring to FIG. 3C, reference numeral 501 denotes the frame portion of the divided region 404; 502, the frame portion of the divided region 405; 503, the frame portion of the divided region 406; and 504, the frame portion of the divided region 407.

Note that the initial mesh generation unit 102 determines the positions of a representative point on the frame portion 501 of the divided region 404 and that on the frame portion 503 of the divided region 406 opposing the divided region 404 such that the distance between these representative points is maximum. As a result, the initial mesh generation unit 102 sets a representative point 507 on the frame portion 501 and sets a representative point 509 on the frame portion 503, as shown in FIG. 3C.

Similarly, the initial mesh generation unit 102 determines the positions of a representative point on the frame portion 502 of the divided region 405 and that on the frame portion 504 of the divided region 407 opposing the divided region 405 such that the distance between these representative points is maximum. As a result, the initial mesh generation unit 102 sets a representative point 508 on the frame portion 502 and sets a representative point 510 on the frame portion 504, as shown in FIG. 3C.

That is, this processing can set one representative point on the frame portion of each divided region and, in turn, can arrange four representative points without any bias.

Referring back to FIG. 2, in step S205, the initial mesh generation unit 102 performs, processing for obtaining a cubic Bezier spline curve (parametric curve) which connects adjacent representative points to each other, for each set of adjacent representative points to obtain four cubic Bezier spline curves. This makes it possible to approximate the frame shape of the object area using these four cubic Bezier spline curves.

In step S206, the initial mesh generation unit 102 generates Coons patches from the four cubic Bezier spline curves obtained in step S205 to obtain one parametric surface from the four cubic Bezier spline curves.

Figure 3D:
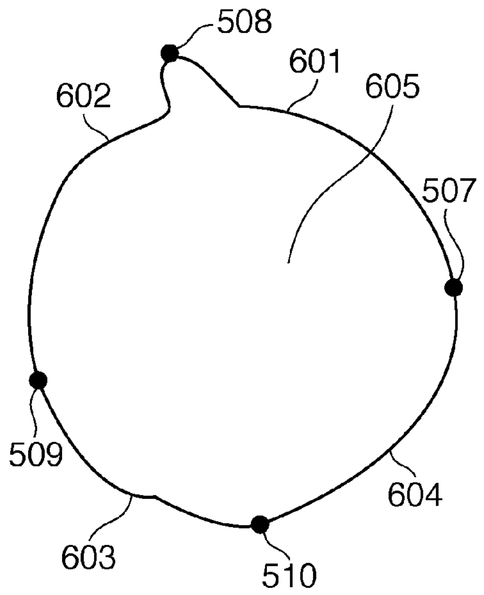

The processes in steps S205 and S206 will be explained with reference to FIG. 3D. Referring to FIG. 3D, reference numeral 601 denotes a cubic Bezier spline curve which connects the representative points 507 and 508; 602, a cubic Bezier spline curve which connects the representative points 508 and 509; 603, a cubic Bezier spline curve which connects the representative points 509 and 510; and 604, a cubic Bezier spline curve which connects the representative points 510 and 507.

Hence, in the case of FIG. 3D, the initial mesh generation unit 102 obtains the four cubic Bezier spline curves 601 to 604 in step S205. Then, the initial mesh generation unit 102 obtains a parametric surface 605 by representing the area surrounded by these four cubic Bezier spline curves 601 to 604 in the form of a parametric surface using Coons patches in step S206. Note that this processing is performed by a known technique, and a more detailed description thereof will not be given.

Referring back to FIG. 2, in step S207, the initial mesh generation unit 102 uniformly divides the parametric surface, obtained in step S206, in the u and v directions to generate a mesh group. That is, the initial mesh generation unit 102 two-dimensionally samples points on the parametric surface in the u and v directions to divide the parametric surface (object area) into meshes each defined by four sampled points. Position information indicating the positions of respective vertices that form the meshes, gradient information of the vertices at these positions, and color information of the vertices at these positions are obtained by this division processing.

To efficiently perform the subsequent optimization processing, it is desirable to generate meshes at positions close to optimal meshes. It is also desirable to adaptively arrange meshes in a number corresponding to the image features.

Figure 4:
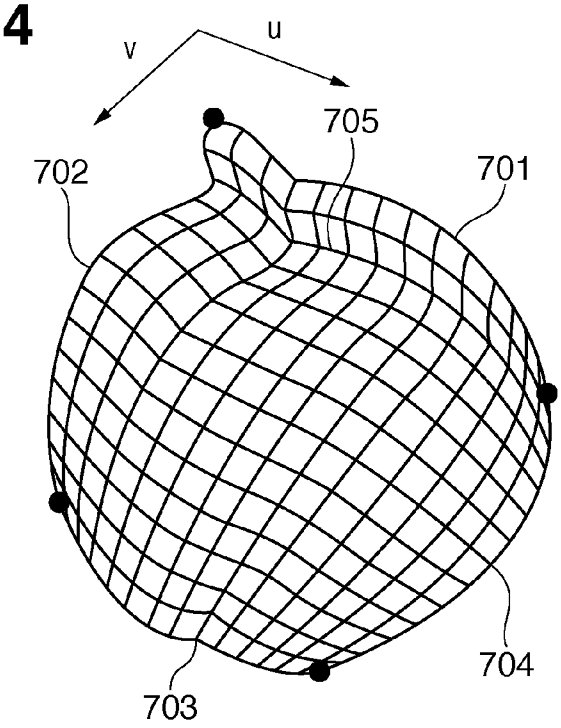
FIG. 4 is a view for explaining the process in step S207.
Figure 5:
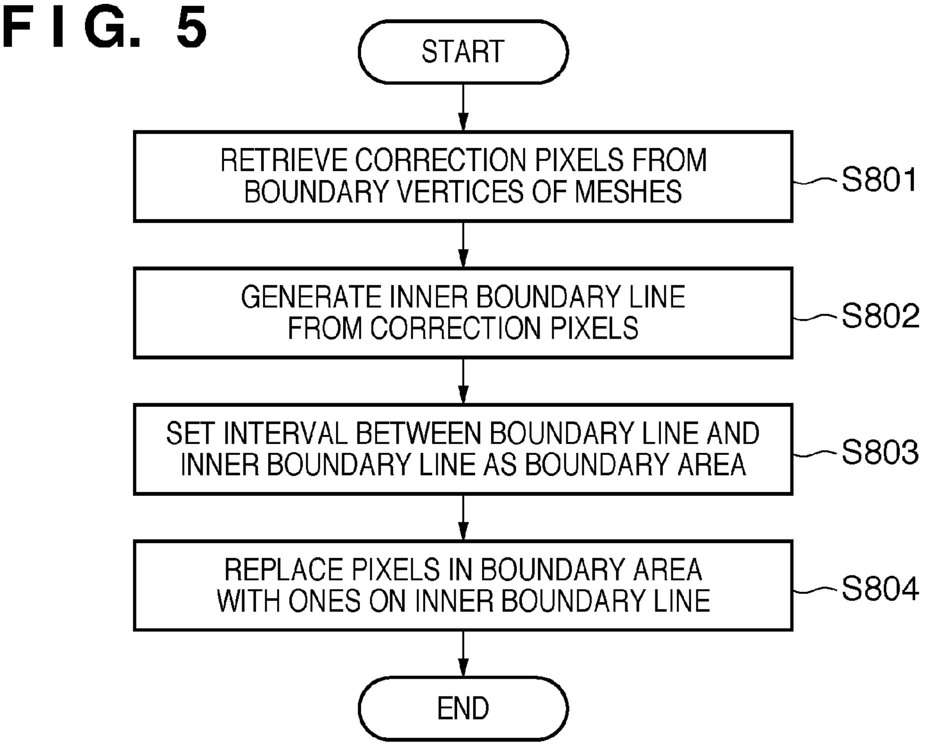
FIG. 5 is a flowchart of processing by a boundary correction unit 103.

The process in step S207 will be explained with reference to FIG. 4. Referring to FIG. 4, cubic Bezier spline curves 701 and 703 extend in the u direction (i.e., the direction defined by the parametric surface), and cubic Bezier spline curves 702 and 704 extend in the v direction (i.e., the direction defined by the parametric surface). In this case, points on the parametric surface are two-dimensionally sampled in the u and v directions to divide the parametric surface into meshes each defined by four sampled points, thereby generating a mesh group 705. That is, the parametric surface is uniformly divided into a plurality of meshes.

Because the parametric surface is described by parameters which take values of 0 to 1 in both the u and v directions, "uniform division" means herein sampling of points at respective positions when the parameters are changed in steps of 0.1 if the parametric surface is divided into, for example, 10 areas. As a matter of course, the numbers of division in the u and v directions may be arbitrarily set. Referring to FIG. 4, the numbers of division in the u and v directions are both 15.

After the initial mesh generation unit 102 performs the above-mentioned processing, the boundary correction unit 103 corrects the boundary portion of the object area using the data on the object area obtained by the object input unit 101 and the initial mesh group obtained by the initial mesh generation unit 102. Processing by the boundary correction unit 103 will be explained with reference to FIGS. 5, 6A to 6F, 7A, and 7B.

Figure 6A:
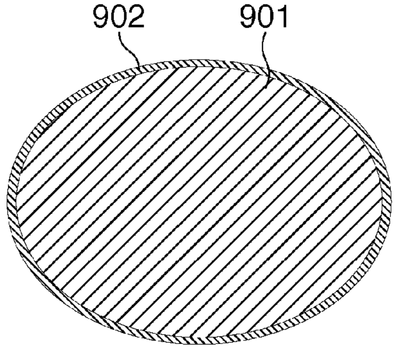
FIGS. 6A to 6F are views showing an object area.

The object area extracted by the object input unit 101 includes a non-anti-aliased area 901 and anti-aliased area 902, as shown in FIG. 6A. If such an object area is processed, the initial mesh generation unit 102 obtains a vertex 950 within the area 901 and a vertex 903 (boundary vertex) within the area 902, as shown in FIG. 6B.

Figure 6D:
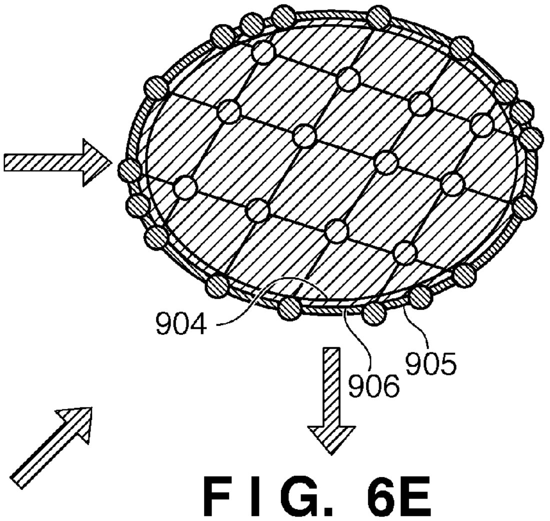
Figure 6B:
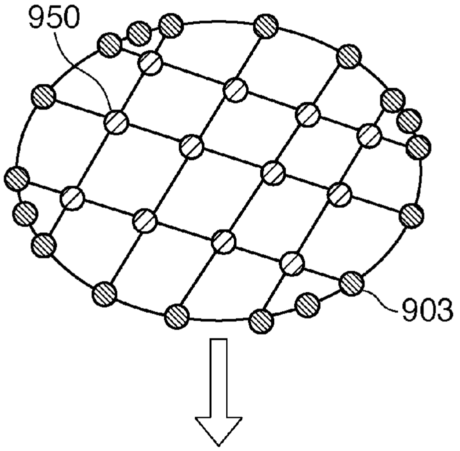
Figure 6E:
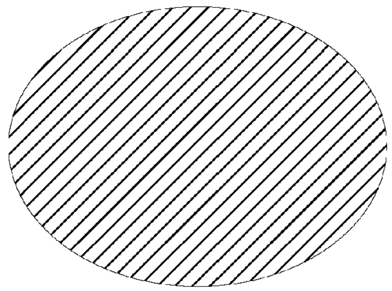
Figure 6C:
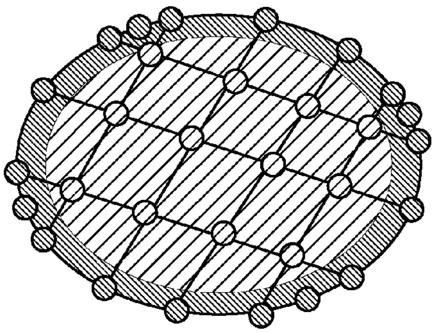

When an initial mesh group defined by a vertex group shown in FIG. 6B is displayed, the adverse influence of an intermediate color generated upon anti-aliasing spreads into the object area, as shown in FIG. 6C, because the colors of gradient meshes are interpolated between the vertices.

In this embodiment, a process of specifying, of a pixel group positioned on one side, in a direction toward the interior of the object area, of a mesh to which the vertex 903 belongs, a pixel at a position where the amount of change in color in this direction is equal to or smaller than a threshold value as a correction pixel is also performed for other boundary vertices. The amount of change in color is calculated by referring neighboring pixels among pixels each positioned on one side. Where X(N) represents a pixel value of N-th pixel positioned on one side and X(N−1) represents a pixel value of (N−1)-th pixel positioned on this side, the amount of change in color D(N) is obtained by calculating the equation $D(N)=|X(N)-X(N-1)|$. When the D(N) is equal to or less than a threshold, the N-th pixel is used as the correction pixel. A curve that connects adjacent correction pixels to each other is obtained for each set of adjacent correction pixels, and the area surrounded by the obtained curves is obtained as a non-correction area. The object area is updated by assigning the values of respective pixels on the frame of the non-correction area to those of corresponding pixels that form a differential area between the non-correction area and the object area. This makes it possible to remove an intermediate color generated upon anti-aliasing.

First, in step S801, the boundary correction unit 103 retrieves a correction pixel for each boundary vertex positioned on the frame (boundary line) of the object area. More specifically, of a pixel group positioned on one side, in a direction toward the interior of the object area, of a mesh to which a boundary vertex belongs, a pixel at a position where the amount of change in color in this direction is equal to or smaller than a threshold value is retrieved and the retrieved pixel is specified as a correction pixel.

Figure 7A:
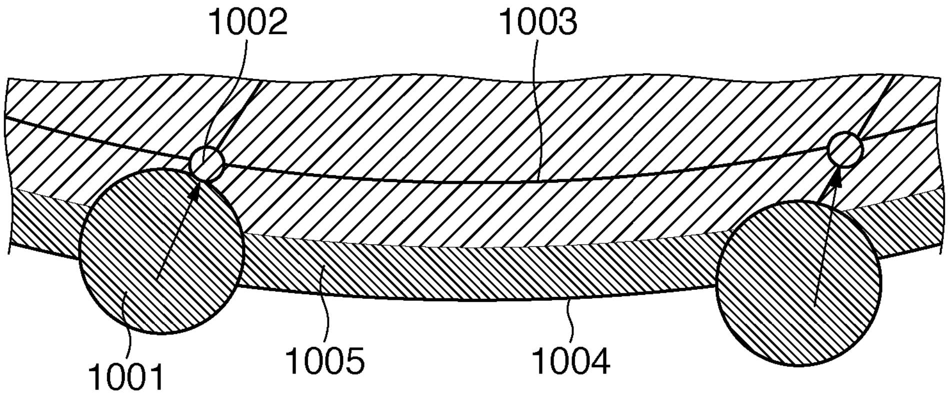
FIGS. 7A and 7B are views showing the boundary portion of the object area.
Figure 7A:
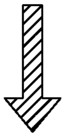

Referring to FIG. 7A, reference numeral 1001 denotes a boundary vertex; and 1004, the frame of the object area. In step S801, a correction pixel retrieval process starts in the direction indicated by an arrow from the boundary vertex 1001, and a pixel at a position where the gradient (the amount of change) in color in this direction is equal to or smaller than a threshold value is specified as a correction pixel. Referring to FIG. 7A, a correction pixel 1002 is specified as a result of the retrieval. Although the correction pixel 1002 having a pixel value of a representative color of an interior of the object area is specified from the color gradient herein, another method may be employed as long as it retrieves a pixel in the direction of the side of a mesh.

In step S802, the boundary correction unit 103 obtains a curve (inner boundary line) which connects adjacent correction pixels to each other for each set of adjacent correction pixels. Although the curve is derived using parametric curves from the meshes, another method may be employed. Referring to FIG. 7A, reference numeral 1003 denotes an inner boundary line. Referring to FIG. 6D, reference numeral 904 denotes an inner boundary line; and 905, the boundary line of the object area.

In step S803, the boundary correction unit 103 sets the interval between the frame (boundary line) of the object area and the inner boundary line as a boundary area. Referring to FIG. 7A, an area 1005 between the boundary line 1004 and the inner boundary line 1003 is the boundary area set in step S803. Referring to FIG. 6D, reference numeral 906 denotes a boundary area.

Figure 7B:
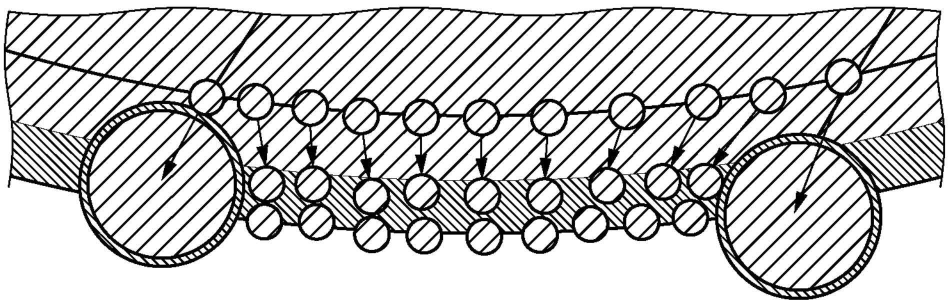

In step S804, the boundary correction unit 103 assigns the values of respective pixels positioned on the inner boundary line 1003 to those of corresponding pixels within the area 1005, as shown in FIG. 7B. Various kinds of processes can be adopted as the assignment process. For example, of a pixel group on the inner boundary line, a pixel at a shortest distance from a pixel of interest within the boundary area is specified, and the value of the specified pixel is assigned to that of the pixel of interest. With the above-mentioned processing, the anti-aliased area is corrected, as shown in FIG. 6E.

Figure 6F:
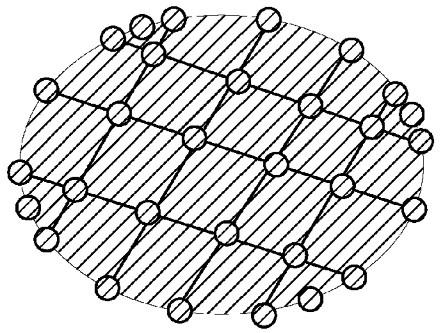

The corrected mesh generation unit 104 performs the same processing as in the initial mesh generation unit 102 using the data on the object area corrected by the boundary correction unit 103 to generate corrected meshes in which anti-aliasing is removed, as shown in FIG. 6F. As can be seen from a comparison between the object areas shown in FIGS. 6C and 6F, the object area shown in FIG. 6F has meshes generated to be more similar to those in the object area shown in FIG. 6A. The data as the result of processing by the corrected mesh generation unit 104 may be stored in a memory within the image processing apparatus or may be output outside the image processing apparatus for the purpose of, e.g., display.

As can be understood from the foregoing description, according to this embodiment, the image quality of an object represented by gradient meshes can be improved by correcting the pixel value in the vicinity of the boundary of an object area to eliminate the adverse influence of an intermediate color between the colors of the object and the background, which is generated upon, e.g., anti-aliasing.

Modification to First Embodiment

The respective units shown in FIG. 1 may be configured by hardware or implemented as software (computer programs). In this case, the software is installed on a memory of a general computer such as a PC (Personal Computer). The computer implements the functions of the above-mentioned image processing apparatus (the functions of the respective units shown in FIG. 1) by executing the installed software by the CPU of the computer. That is, the computer is applicable to the above-mentioned image processing apparatus. An example of the hardware configuration of a computer which can be adopted as the image processing apparatus according to the first embodiment will be explained with reference to FIG. 8.

A CPU 1101 controls the overall computer using computer programs and data stored in a RAM 1102 and ROM 1103, and performs the above-described respective processes of the image processing apparatus. That is, the CPU 1101 performs the above-described respective processes of the corresponding units shown in FIG. 1.

The RAM 1102 is one example of computer-readable storage media. The RAM 1102 includes an area for temporarily storing, e.g., computer programs and data loaded from an external storage device 1107 and storage medium drive 1108 and data received from an external device via an I/F (interface) 1109. The RAM 1102 moreover includes a work area for use in various types of processes by the CPU 1101. That is, the RAM 1102 can provide various types of areas as needed. The ROM 1103 is one example of computer-readable storage media and stores computer setting data, a boot program, and the like.

A keyboard 1104 and mouse 1105 can be used to input various types of instructions to the CPU 1101 by being manipulated by the operator of the computer. A display device 1106 includes, e.g., a CRT or a liquid crystal screen, and can display the result of processing by the CPU 1101 in the form of, e.g., images and texts. The display device 1106 can, for example, display the above-described input image, clearly display the extracted object area, display the updated (corrected) object area, and display, e.g., the cubic Bezier spline curves and parametric surface obtained in the process of mesh encoding.

The external storage device 1107 is one example of computer-readable storage media and is a large-capacity information storage device typified by a hard disk drive device. The external storage device 1107 saves, e.g., the OS (Operating System), computer programs and data for causing the CPU 1101 to implement the functions of the respective units shown in FIG. 1, data on the above-described input image, and the above-described known information. The computer programs and data saved in the external storage device 1107 are loaded into the RAM 1102 under the control of the CPU 1101 as needed and are processed by the CPU 1101.

The storage medium drive 1108 reads out computer programs and data recorded on a storage medium such as a CD-ROM or a DVD-ROM, and outputs the readout computer programs and data to the external storage device 1107 and RAM 1102. Some or all of the above-described information saved in the external storage device 1107 may be recorded on the storage medium and read out by the storage medium drive 1108.

The I/F 1109 is used to connect an external device to the computer. A device for acquiring the above-described input image, such as a digital camera, may be connected to the I/F 1109 to load the input image into the RAM 1102 and external storage device 1107 via the I/F 1109 from the device. Reference numeral 1110 denotes a bus that connects the above-mentioned respective units to each other.

In the above-mentioned configuration, when the power supply of the computer is turned on, the CPU 1101 loads the OS from the external storage device 1107 into the RAM 1102 in accordance with the above-mentioned boot program stored in the ROM 1103. This enables an information input operation via the keyboard 1104 and mouse 1105 and display of a GUI on the display device 1106. When the user manipulates the keyboard 1104 and mouse 1105 to input instructions for starting up an image processing application program stored in the external storage device 1107 to the CPU 1101, the CPU 1101 loads the program into the RAM 1102 and executes it. With this operation, the computer functions as the above-mentioned image processing apparatus. The image processing application program executed by the CPU 1101 basically includes mathematical functions corresponding to the respective constituent elements shown FIGS. 2 and 5.

Second Embodiment

In the first embodiment, the values of all pixels that form a boundary area are corrected. However, in the first embodiment, although the adverse influence of an intermediate color can be widely eliminated, pixels to be used to form an object may also be undesirably corrected. Furthermore, the boundary vertices of gradient meshes need only be moved on the boundary line of the object in the subsequent processes where necessary. Hence, correction of at least the boundary pixels of the object makes it possible to eliminate the adverse influence of an intermediate color attributed to rendering of meshes. In view of this, in the second embodiment, only pixels on the boundary line of an object area are corrected. An image processing apparatus according to the second embodiment is different only in the operation of a boundary correction unit 103 from the first embodiment.

Figure 10A:
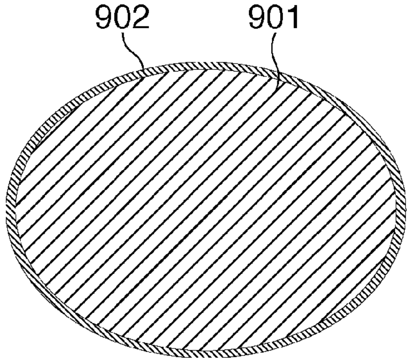
FIGS. 10A to 10F are views showing an object area.

The object area extracted by an object input unit 101 includes a non-anti-aliased area 901 and anti-aliased area 902, as shown in FIG. 10A. If such an object area is processed, an initial mesh generation unit 102 obtains a vertex 950 within the area 901 and a vertex 903 (boundary vertex) within the area 902, as shown in FIG. 10B.

Figure 10D:
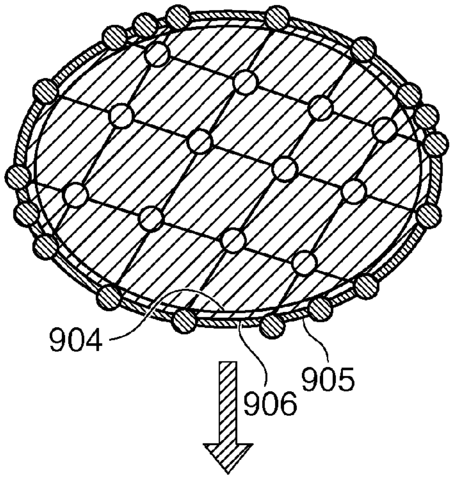
Figure 10B:
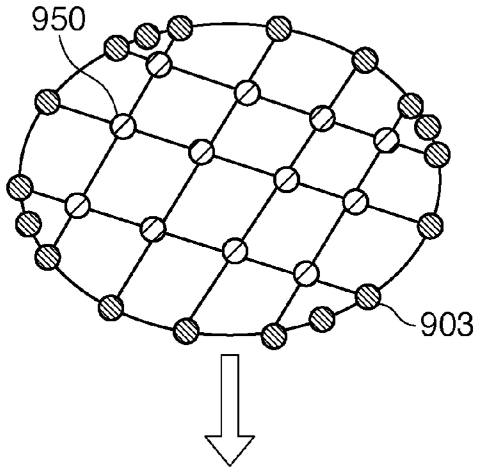
Figure 10E:
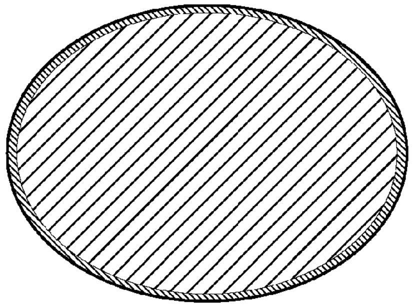
Figure 10C:
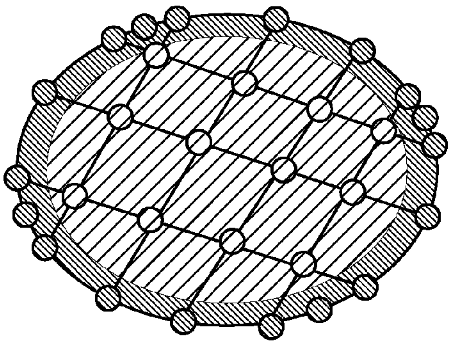

When an initial mesh group defined by a vertex group shown in FIG. 10B is displayed, the adverse influence of an intermediate color generated upon anti-aliasing spreads into the object area, as shown in FIG. 10C, because the colors of gradient meshes are interpolated between the vertices.

In this embodiment, a process of specifying, of a pixel group positioned on one side, in a direction toward the interior of the object area, of a mesh to which the vertex 903 belongs, a pixel at a position where the amount of change in color in this direction is equal to or smaller than a threshold value as a correction pixel is also performed for other boundary vertices. A curve that connects adjacent correction pixels to each other is obtained for each set of adjacent correction pixels, and the area surrounded by the obtained curves is obtained as a non-correction area. The object area is updated by assigning the values of respective pixels on the frame of the non-correction area to those of corresponding pixels positioned on the frame of the object area.

First, in step S1201 as shown in FIG. 9, the boundary correction unit 103 retrieves a correction pixel for each boundary vertex positioned on the frame (boundary line) of the object area, like step S801 described above.

In step S1202, the boundary correction unit 103 obtains a curve (inner boundary line) that connects adjacent correction pixels to each other for each set of adjacent correction pixels, like step S802 described above.

In step S1203, the boundary correction unit 103 sets the interval between the frame (boundary line) of the object area and the inner boundary line as a boundary area. Referring to FIG. 10D, reference numeral 906 denotes a boundary area.

Figure 11:
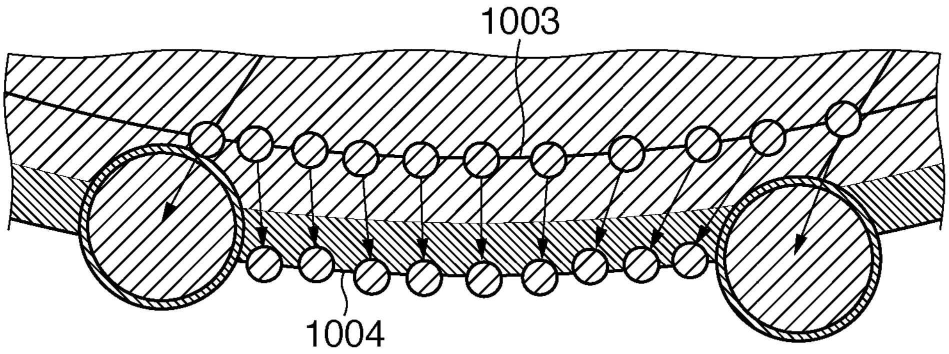
FIG. 11 is a view showing the boundary portion of the object area.

In step S1204, the boundary correction unit 103 assigns the values of respective pixels positioned on an inner boundary line 1003 to those of corresponding pixels on a frame 1004 of the object area, as shown in FIG. 11. Various kinds of processes can be adopted as the assignment process. For example, of a pixel group on the inner boundary line, a pixel at a shortest distance from a pixel of interest on the boundary line of the object area is specified, and the value of the specified pixel is assigned to that of the pixel of interest. With the above-mentioned processing, the frame of the object area is corrected, as shown in FIG. 10E.

Figure 10F:
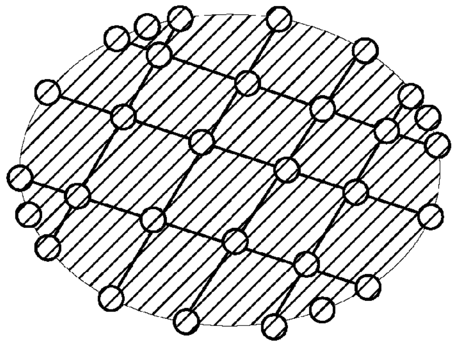

A corrected mesh generation unit 104 performs the same processing as in the initial mesh generation unit 102 using the data on the object area corrected by the boundary correction unit 103 to generate corrected meshes in which anti-aliasing is removed, as shown in FIG. 10F. As can be seen from a comparison between the object areas shown in FIGS. 10C and 10F, the object area shown in FIG. 10F has meshes generated to be more similar to those in the object area shown in FIG. 10A. The data as the result of processing by the corrected mesh generation unit 104 may be stored in a memory within the image processing apparatus or may be output outside the image processing apparatus for the purpose of, e.g., display.

As can be understood from the foregoing description, according to this embodiment, the image quality of an object represented by gradient meshes can be improved by correcting the pixel value at the boundary of an object area to eliminate the adverse influence of an intermediate color between the colors of the object and the background, which is generated upon, e.g., anti-aliasing.

Modification to Second Embodiment

In the second embodiment, the values of all pixels on the boundary line of an object area are corrected. However, if only a part of the object area is anti-aliased, a portion that does not require correction is also undesirably corrected in the second embodiment. In view of this, in this modification, it is determined whether to correct the values of pixels that form the frame portions of areas, each including adjacent boundary vertices and correction pixels obtained by these boundary vertices, for each of the areas. An image processing apparatus according to this modification is different only in the operation of a boundary correction unit 103 from the first embodiment.

Figure 13A:
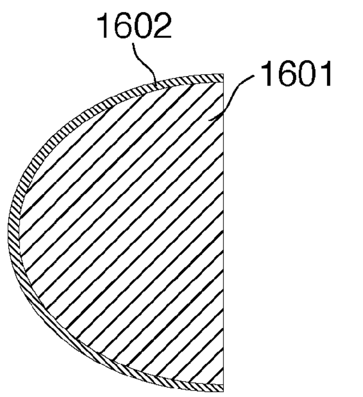
FIGS. 13A to 13F are views showing an object area.

The object area extracted by an object input unit 101 includes a non-anti-aliased area 1601 and anti-aliased area 1602, as shown in FIG. 13A. Note that in this modification, not the entire periphery of the object area is anti-aliased. If such an object area is processed, an initial mesh generation unit 102 obtains a vertex 1650 within the area 1601 and a vertex 1603 (boundary vertex) within the area 1602, as shown in FIG. 13B.

Figure 13B:
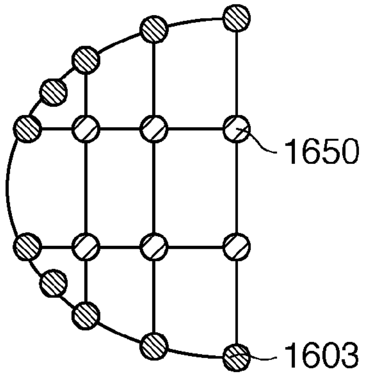
Figure 13C:
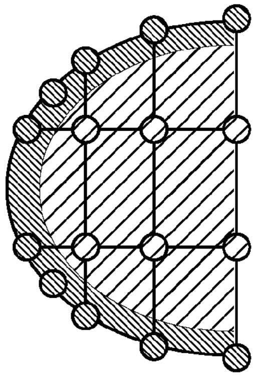

When an initial mesh group defined by a vertex group shown in FIG. 13B is displayed, the adverse influence of an intermediate color generated upon anti-aliasing spreads into the object area, as shown in FIG. 13C, because the colors of gradient meshes are interpolated between the vertices.

According to this modification, in the above-described second embodiment, an error between the colors before and after rendering is obtained for each area including two adjacent boundary vertices and correction pixels corresponding to these two adjacent boundary vertices, before assigning pixel values. The object area is updated by assigning the values of respective pixels on the frame of a non-correction area to those of corresponding pixels positioned on a portion, other than an area in which the color error is smaller than a threshold value, of the frame of the object area.

Figure 12:
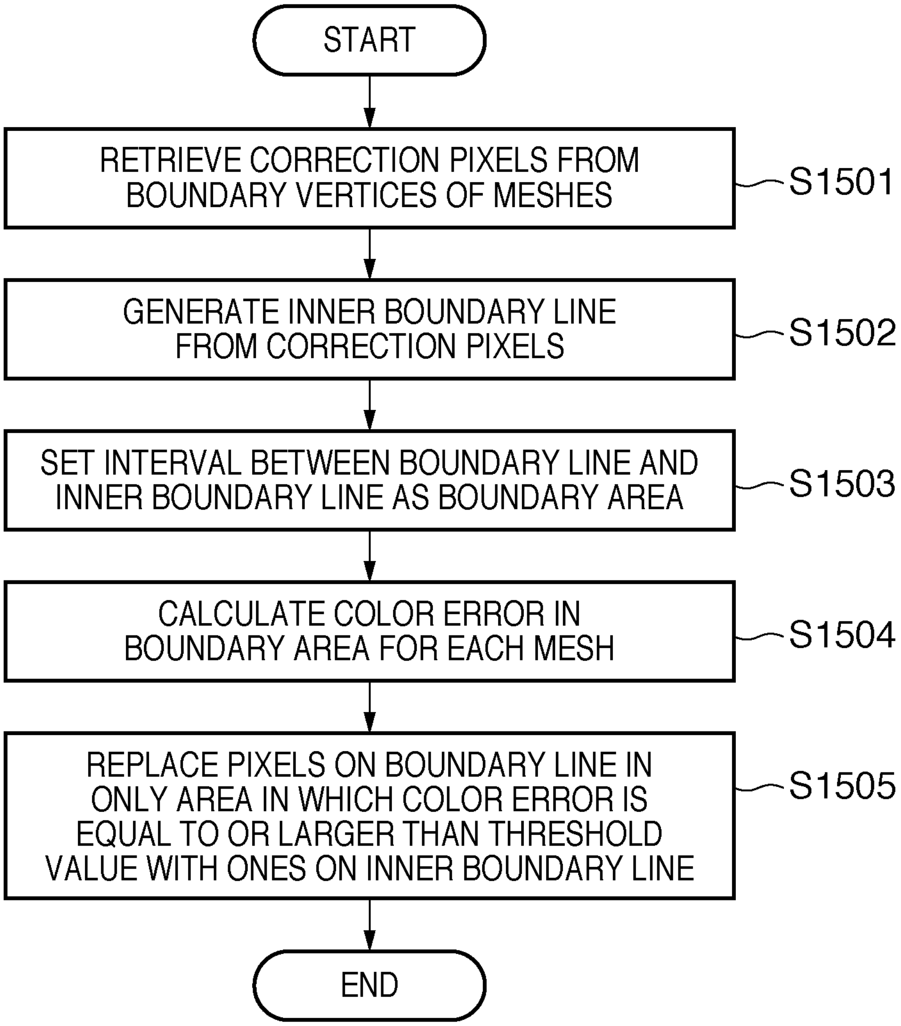
FIG. 12 is a flowchart of processing by a boundary correction unit 103.
Figure 13D:
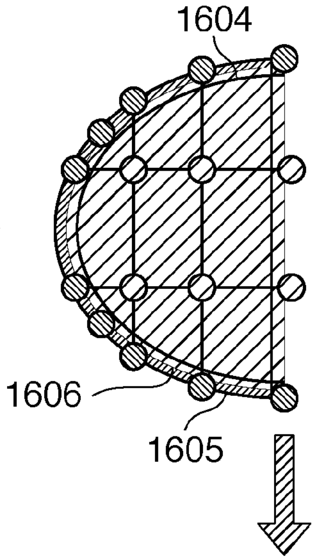

Processing by the boundary correction unit 103 will be explained in more detail next with reference to FIGS. 12, 14A, and 14B. First, in step S1501, the boundary correction unit 103 retrieves a correction pixel for each boundary vertex positioned on the frame (boundary line) of the object area, like step S801 described above. Referring to FIG. 13D, reference numeral 1605 denotes the boundary line of the object area.

Figure 14A:
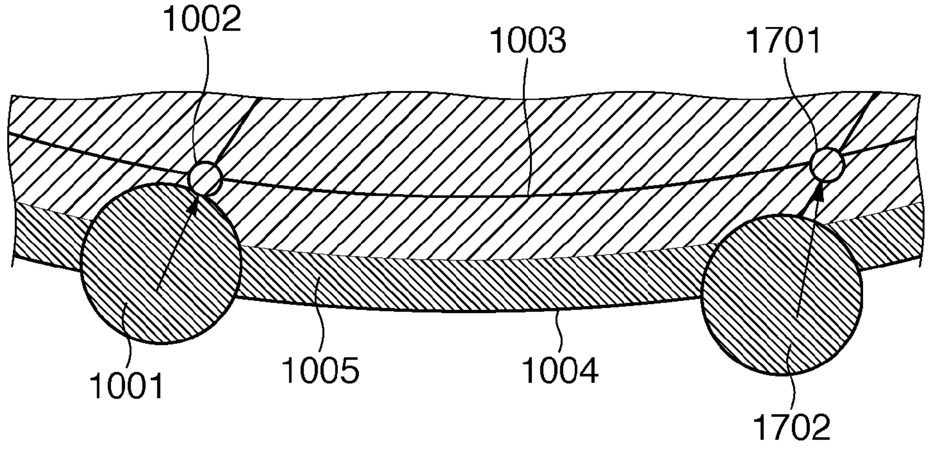
FIGS. 14A and 14B are views showing the boundary portion of the object area.
Figure 14B:
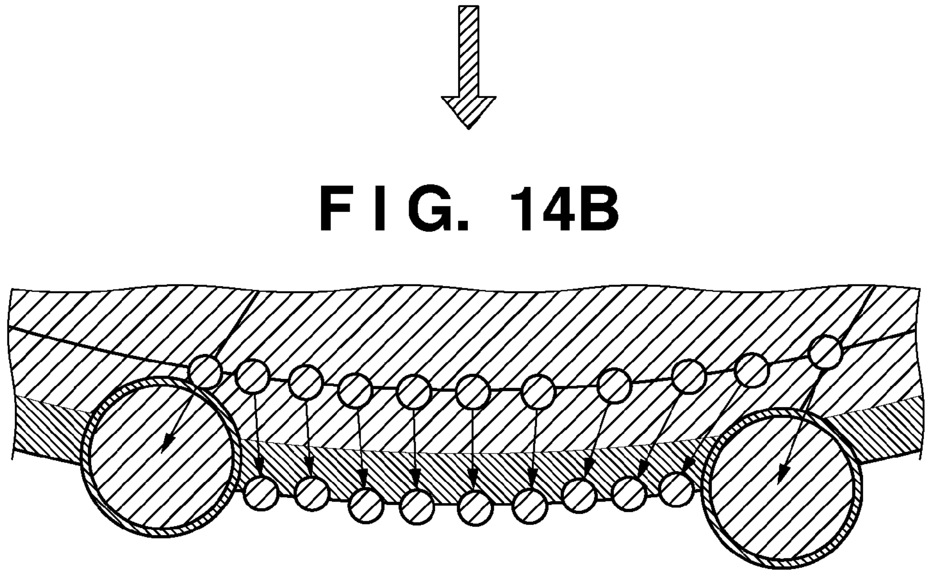

Referring to FIG. 14A, reference numerals 1001 and 1702 denote two adjacent boundary vertices; and 1004, the frame of the object area. Also, reference numerals 1002 and 1701 denote two adjacent correction pixels, which correspond to the boundary vertices 1001 and 1702, respectively.

In step S1502, the boundary correction unit 103 obtains a curve (inner boundary line) which connects adjacent correction pixels to each other for each set of adjacent correction pixels, like step S802 described above. Referring to FIG. 13D, reference numeral 1604 denotes an inner boundary line.

In step S1503, the boundary correction unit 103 sets the interval between the frame (boundary line) of the object area and the inner boundary line as a boundary area. Referring to FIG. 13D, reference numeral 1606 denotes a boundary area.

In step S1504, the boundary correction unit 103 obtains an error between the colors before and after rendering for each area including two adjacent boundary vertices and correction pixels corresponding to these two adjacent boundary vertices. In the example shown in FIG. 14A, the sum of the differences between the values of respective pixels in an area including the boundary vertices 1001 and 1702 and correction pixels 1002 and 1701 before rendering and those of the respective pixels in this area after rendering is obtained as the above-mentioned color error. A method of calculating a color error is not limited to this, as a matter of course.

Figure 13E:
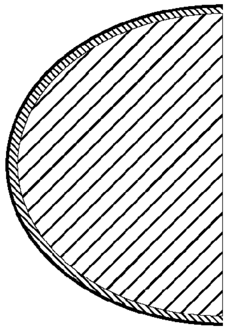

In step S1505, the boundary correction unit 103 assigns the values of respective pixels which form the frame of the inner boundary line to those of corresponding pixels on a portion, other than an area in which the color error obtained in step S1504 is smaller than a threshold value, of the boundary line of the object area. The assignment method is the same as in the second embodiment. With the above-mentioned processing, the anti-aliased portion of the frame of the object area is corrected, as shown in FIG. 13E.

Figure 13F:
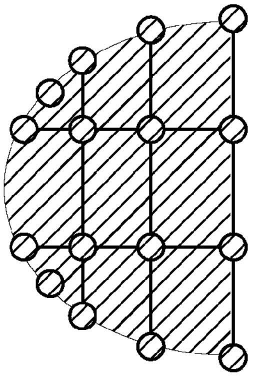

A corrected mesh generation unit 104 performs the same processing as in the initial mesh generation unit 102 using the data on the object area corrected by the boundary correction unit 103 to generate corrected meshes in which anti-aliasing is removed, as shown in FIG. 13F. As can be seen from a comparison between the object areas shown in FIGS. 13C and 13F, the object area shown in FIG. 13F has meshes generated to be more similar to those in the object area shown in FIG. 13A. The data as the result of processing by the corrected mesh generation unit 104 may be stored in a memory within the image processing apparatus or may be output outside the image processing apparatus for the purpose of, e.g., display.

A computer that exemplifies the hardware configuration shown in FIG. 8 is naturally applicable to the image processing apparatuses used in the second embodiment and the modification to it. In this case, the image processing application program executed by a CPU 1101 basically includes mathematical functions corresponding to the respective constituent elements shown FIGS. 9 and 12.

Third Embodiment

In both the first and second embodiments, an initial mesh group is generated based on an object area, the vicinity of the boundary of the object area is corrected using the initial meshes, and a mesh group is generated again for the corrected object area. However, the generation of both an initial mesh group and an inner boundary line requires substantial calculation costs. In the third embodiment, to more easily correct the boundary, the boundary of an object area is directly corrected without generating an initial mesh group, and a mesh group is generated for the object area whose boundary is corrected.

Figure 15:
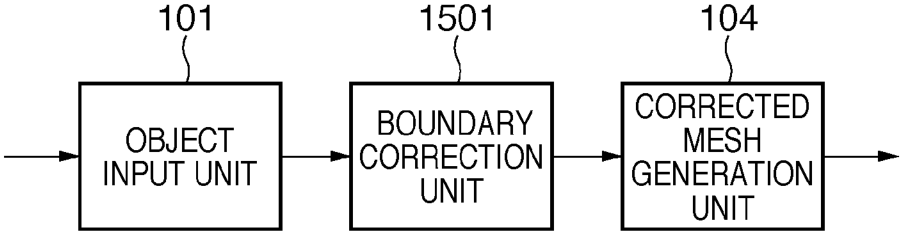
FIG. 15 is a block diagram illustrating an example of the functional arrangement of an image processing apparatus according to the third embodiment.
Figure 16:
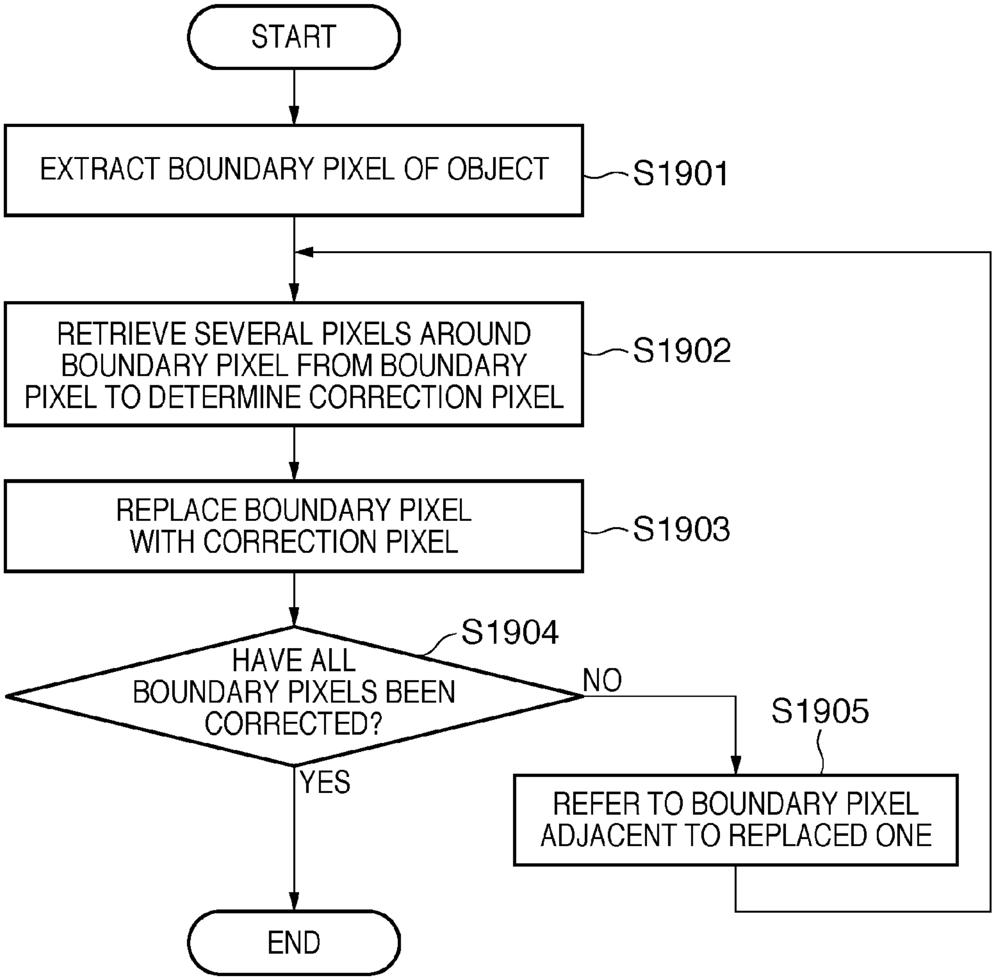
FIG. 16 is a flowchart of processing by a boundary correction unit 1501.

An example of the functional arrangement of an image processing apparatus according to this embodiment will be explained first with reference to FIG. 15. As shown in FIG. 15, the image processing apparatus according to this embodiment includes an object input unit 101, boundary correction unit 1501, and corrected mesh generation unit 104. That is, the image processing apparatus according to this embodiment uses the boundary correction unit 1501 in place of the initial mesh generation unit 102 and boundary correction unit 103 in the arrangement (FIG. 1) of the image processing apparatus according to the first embodiment. However, operations other than that of the boundary correction unit 1501 are the same as those described in the first embodiment, and the operation of only the boundary correction unit 1501 will be explained below with reference to FIGS. 16, 17A to 17F, and 18A to 18C.

Figure 17A:
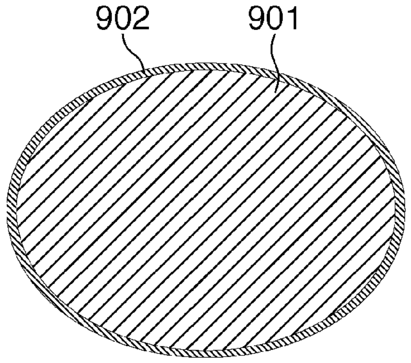
FIGS. 17A to 17F are views showing an object area.

The object area extracted by the object input unit 101 includes a non-anti-aliased area 901 and anti-aliased area 902, as shown in FIG. 17A. If a mesh group is generated based on such an object area, a vertex 1705 within the area 901 and a vertex 1703 (boundary vertex) within the area 902 are obtained, as shown in FIG. 17B.

Figure 17D:
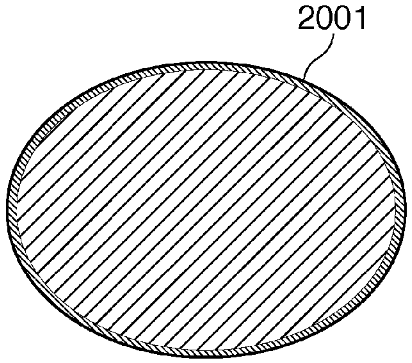
Figure 17B:
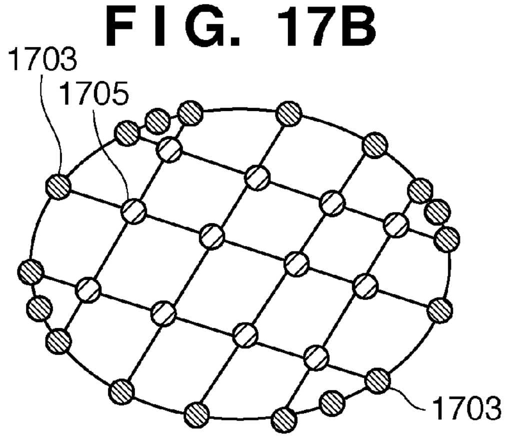
Figure 17E:
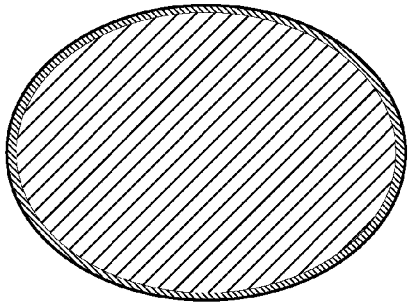
Figure 17C:
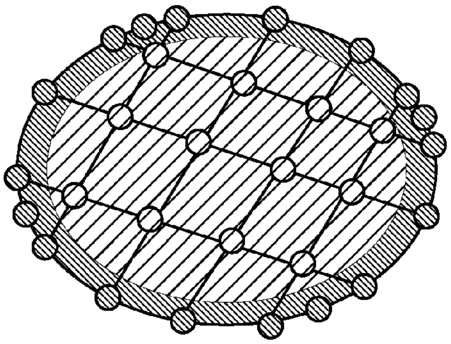

When a mesh group defined by a vertex group shown in FIG. 17B is displayed, the adverse influence of an intermediate color generated upon anti-aliasing spreads into the object area, as shown in FIG. 17C, because the colors of gradient meshes are interpolated between the vertices.

In this embodiment, the object area is updated by specifying a pixel within the object area in the vicinity of a boundary pixel, positioned on the frame of the object area, as a correction pixel for each boundary pixel, and assigning the value of each correction pixel to that of a corresponding boundary pixel. After that, the updated object area is divided into a plurality of meshes and position information, gradient information, and color information are obtained at respective vertices that form the meshes. This makes it possible to remove an intermediate color generated upon anti-aliasing without generating an initial mesh group.

Processing by the boundary correction unit 1501 will be explained in more detail next with reference to FIGS. 16, 17A to 17F, and 18A to 18C. First, in step S1901, the boundary correction unit 1501 selects one of pixels on the boundary line of the object area as a selected pixel. Referring to FIG. 18A, reference numeral 2101 denotes a selected pixel. Referring to FIG. 17D, reference numeral 2001 denotes the boundary line of the object area.

In step S1902, the boundary correction unit 1501 sets a rectangular area which has a size of N pixels×N pixels and the pixel selected in step S1901 as a center, and determines a pixel with an RGB color most different from the background color within both the rectangular area and the object area as a correction pixel. Although N=5 herein, N may be another integer.

Figure 18A:
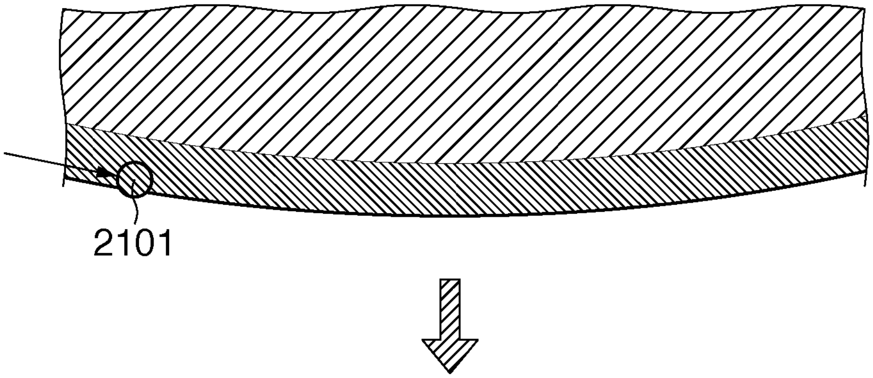
FIGS. 18A to 18C are views showing the boundary portion of the object area.
Figure 18B:
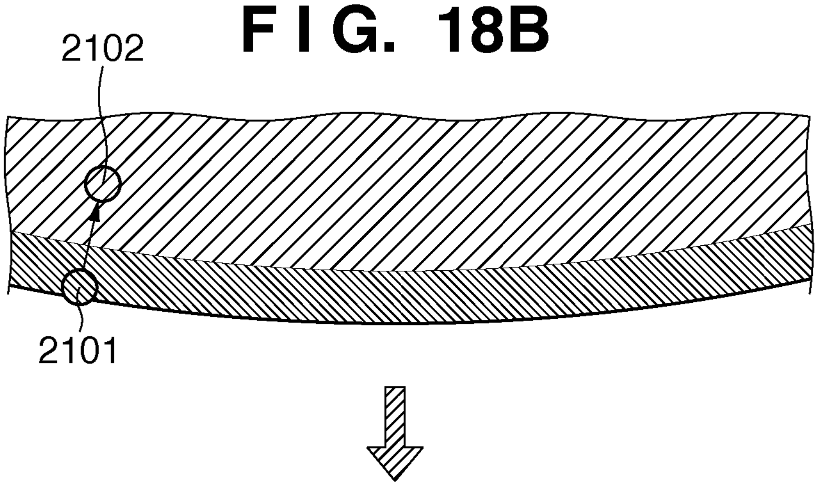

Various kinds of methods of determining a correction pixel are available, in addition to the foregoing method. For example, a specific position (e.g., a central position) may be set within the object area, and a pixel at a position where the amount of change in color in a direction toward the specific position is equal to or smaller than a threshold value may be determined as a correction pixel from the selected pixel. Referring to FIG. 18B, reference numeral 2102 denotes a correction pixel determined from the selected pixel 2101.

Figure 18C:
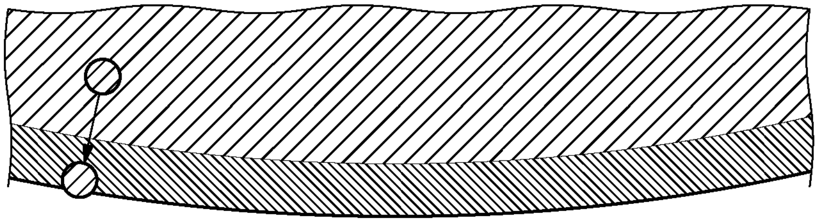

In step S1903, the boundary correction unit 1501 updates the value of the selected pixel to that of the correction pixel, as shown in FIG. 18C. In step S1904, the boundary correction unit 1501 determines whether all pixels on the boundary line of the object area have been selected as selected pixels.

If it is determined in step S1904 that all pixels on the boundary line of the object area have been selected as selected pixels, the process ends. If a pixel remains to be selected, the process advances to step S1905.

In step S1905, the boundary correction unit 1501 selects an unselected pixel adjacent to the pixel whose value is updated in step S1903. The process returns to step S1902 to perform the subsequent processes for the pixel selected in step S1905. With the above-mentioned processing, the anti-aliased portion of the frame of the object area is corrected, as shown in FIG. 17E.

Figure 17F:
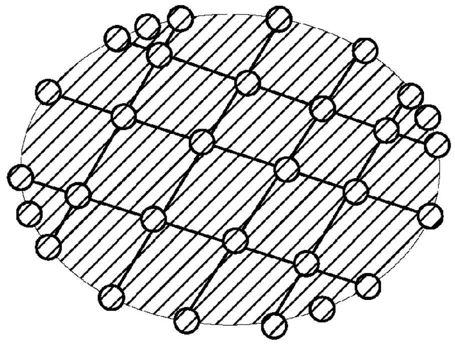

The corrected mesh generation unit 104 operates as has been described in the first and second embodiments using the data on the object area corrected by the boundary correction unit 1501 to generate corrected meshes in which anti-aliasing is removed, as shown in FIG. 17F. As can be seen from a comparison between the object areas shown in FIGS. 17C and 17F, the object area shown in FIG. 17F has meshes generated to be more similar to those in the object area shown in FIG. 17A. The data as the result of processing by the corrected mesh generation unit 104 may be stored in a memory within the image processing apparatus or may be output outside the image processing apparatus for the purpose of, e.g., display.

As can be understood from the foregoing description, according to this embodiment, the pixel value at the object boundary is directly corrected without generating an initial mesh group. Hence, the adverse influence of an intermediate color between the colors of the object and the background, which is generated upon, e.g., anti-aliasing, can be more easily eliminated than the methods in the first and second embodiments. This makes it possible to improve the image quality of an object represented by gradient meshes.

A computer that exemplifies the hardware configuration shown in FIG. 8 is naturally applicable to the image processing apparatus used in the third embodiment. In this case, the image processing application program executed by a CPU 1101 basically includes mathematical functions corresponding to the respective constituent elements shown FIG. 16. The above-described embodiments and modifications may be used in combination with each other.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-094367 filed Apr. 8, 2009 and 2010-051126 filed Mar. 8, 2010, which are hereby incorporated by reference herein in their entirety.

What is claimed is:

1. An image processing apparatus comprising:

a unit which extracts an area of an object from an image as an object area;

a division unit which divides the object area into a plurality of meshes and obtains position information, gradient information, and color information of respective vertices which form the meshes;

a specification unit which specifies, of a pixel group positioned on one side, in a direction toward an interior of the object area, of a mesh to which a boundary vertex positioned on a frame of the object area belongs, a pixel at a position where an amount of change in color in the direction is not more than a threshold value as a correction pixel for each boundary vertex;

a unit which obtains a curve that connects adjacent correction pixels to each other for each set of adjacent correction pixels, and obtains an area surrounded by the obtained curves as a non-correction area; and an update unit which updates the object area by assigning values of respective pixels on a frame of the non-correction area to values of corresponding pixels positioned on the frame of the object area.

2. The apparatus according to claim 1, wherein the update unit updates the object area by assigning values of respective pixels on the frame of the non-correction area to values of corresponding pixels which form a differential area between the non-correction area and the object area, the values of the corresponding pixels including values of respective pixels positioned on the frame of the object area.

3. The apparatus according to claim 1, further comprising a unit which obtains an error between colors before and after rendering for each area consisting of two adjacent boundary vertices and correction pixels corresponding to the two adjacent boundary vertices, wherein the update unit updates the object area by assigning values of respective pixels on the frame of the non-correction area to values of corresponding pixels positioned on a portion, other than an area in which the color error is smaller than a threshold value, of the frame of the object area.

4. The apparatus according to claim 1, wherein the division unit further divides the updated object area by the update unit into a plurality of meshes and obtains position information, gradient information, and color information of respective vertices which form the meshes of the updated object area.

5. An image processing apparatus comprising:

a unit which extracts an area of an object from an image as an object area;

a specification unit which specifies a pixel within the object area in the vicinity of a boundary pixel, positioned on a frame of the object area, as a correction pixel for each boundary pixel;

an update unit which updates the object area by assigning a value of the correction pixel to a value of the boundary pixel; and a division unit which divides the object area updated by the update unit into a plurality of meshes and obtains position information, gradient information, and color information of respective vertices which form the meshes, wherein the specification unit specifies, as the correction pixel, a pixel at a position where an amount of change in color in a direction toward a specific position within the object area from a position of the boundary pixel is not more than a threshold value.

6. The apparatus according to claim 1, wherein the division unit comprises a unit which obtains a reference position within the object area, a unit which sets two axes, which pass through the reference position and are orthogonal to each other, within the object area to divide the object area into four divided regions by the two axes, a unit which sets representative points on frame portions of the respective divided regions such that a distance between the representative points in opposing divided regions is longest, a unit which performs, processing for obtaining a curve which connects adjacent representative points to each other, for each set of adjacent representative points to obtain four curves, a unit which obtains a surface for an area surrounded by the four curves, using the four curves, and a unit which two-dimensionally samples points on the surface in respective directions of the two axes defined by the surface to divide the object area into meshes each defined by four points, thereby obtaining position information, gradient information, and color information of respective vertices which form the meshes.

7. The apparatus according to claim 1, wherein the curve includes a cubic Bezier spline curve.

8. The apparatus according to claim 6, wherein the surface includes a Coons patch.

9. An image processing method for an image processing apparatus, comprising:

a step of extracting an area of an object from an image as an object area by a processing unit included in the image processing apparatus;

a division step of, by the processing unit, dividing the object area into a plurality of meshes and obtaining position information, gradient information, and color information of respective vertices which form the meshes;

a specification step of, by the processing unit, specifying, of a pixel group positioned on one side, in a direction toward an interior of the object area, of a mesh to which a boundary vertex positioned on a frame of the object area belongs, a pixel at a position where an amount of change in color in the direction is not more than a threshold value as a correction pixel for each boundary vertex;

a step of, by the processing unit, obtaining a curve which connects adjacent correction pixels to each other for each set of adjacent correction pixels, and obtaining an area surrounded by the obtained curves as a non-correction area; and an update step of, by the processing unit, updating the object area by assigning values of respective pixels on a frame of the non-correction area to values of corresponding pixels positioned on the frame of the object area.

10. An image processing method for an image processing apparatus, comprising:

a step of extracting an area of an object from an image as an object area;

a specification step of specifying a pixel within the object area in the vicinity of a boundary pixel, positioned on a frame of the object area, as a correction pixel for each boundary pixel;

an update step of updating the object area by assigning a value of the correction pixel to a value of the boundary pixel; and a division step of dividing the object area updated in the update step into a plurality of meshes and obtaining position information, gradient information, and color information of respective vertices which form the meshes, wherein the specification step specifies, as the correction pixel, a pixel at a position where an amount of change in color in a direction toward a specific position within the object area from a position of the boundary pixel is not more than a threshold value.

11. A non-transitory computer-readable storage medium storing a computer program for causing a computer to function as each unit of an image processing apparatus defined in claim 1.

* * * * *